United States Patent [19]

Morgan

[11] Patent Number: 5,303,602

[45] Date of Patent: Apr. 19, 1994

[54] TOOL FOR INSERTING AND REMOVING A SENSING ELEMENT FROM A FLUID PIPELINE

[75] Inventor: Robert K. Morgan, Boulder, Colo.

[73] Assignee: Veris, Inc., Boulder, Colo.

[21] Appl. No.: 850,760

[22] Filed: Mar. 13, 1992

[51] Int. Cl.⁵ ............................................. G01F 15/00
[52] U.S. Cl. ................................................... 73/866.5
[58] Field of Search ................ 73/866.5, 86; 324/447; 374/148, 208; 137/317, 320

[56] References Cited

U.S. PATENT DOCUMENTS

| | | | |
|---|---|---|---|
| 4,633,713 | 1/1987 | Mesnard et al. | 73/866.5 |
| 4,665,760 | 5/1987 | Eramo et al. | 73/866.5 |
| 4,841,787 | 6/1989 | Waterman | 73/866.5 |
| 4,951,512 | 8/1990 | Mazza et al. | 73/866.5 |
| 5,009,113 | 4/1991 | Kamrat | 73/866.5 |
| 5,036,711 | 8/1991 | Good | 73/861.66 |
| 5,106,580 | 4/1992 | Mudiam | 73/866.5 |

*Primary Examiner*—Robert Raevis
*Attorney, Agent, or Firm*—Gregg I. Anderson

[57] ABSTRACT

A tool adapted for inserting and removing pitot tubes or other sensing elements through a hot tap into a fluid conveying pipeline is mounted to the side of the hot tap. A drive tube is slidably inserted into a protective enclosing tube, with the enclosing tube being attached to the hot tap and the drive tube being attached to the sensing element. Rotation of a threaded drive shaft causes a threaded bushing connected to the drive tube to move upward and downward within the enclosing tube depending on the direction of rotation. Downward movement of the drive tube inserts the sensing element into the pipeline through the hot tap and upward movement of the drive tube removes the sensing element from the hot tap.

22 Claims, 2 Drawing Sheets

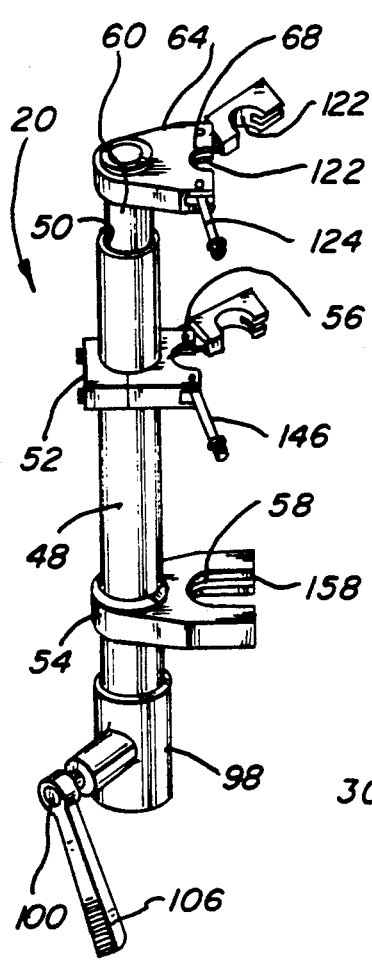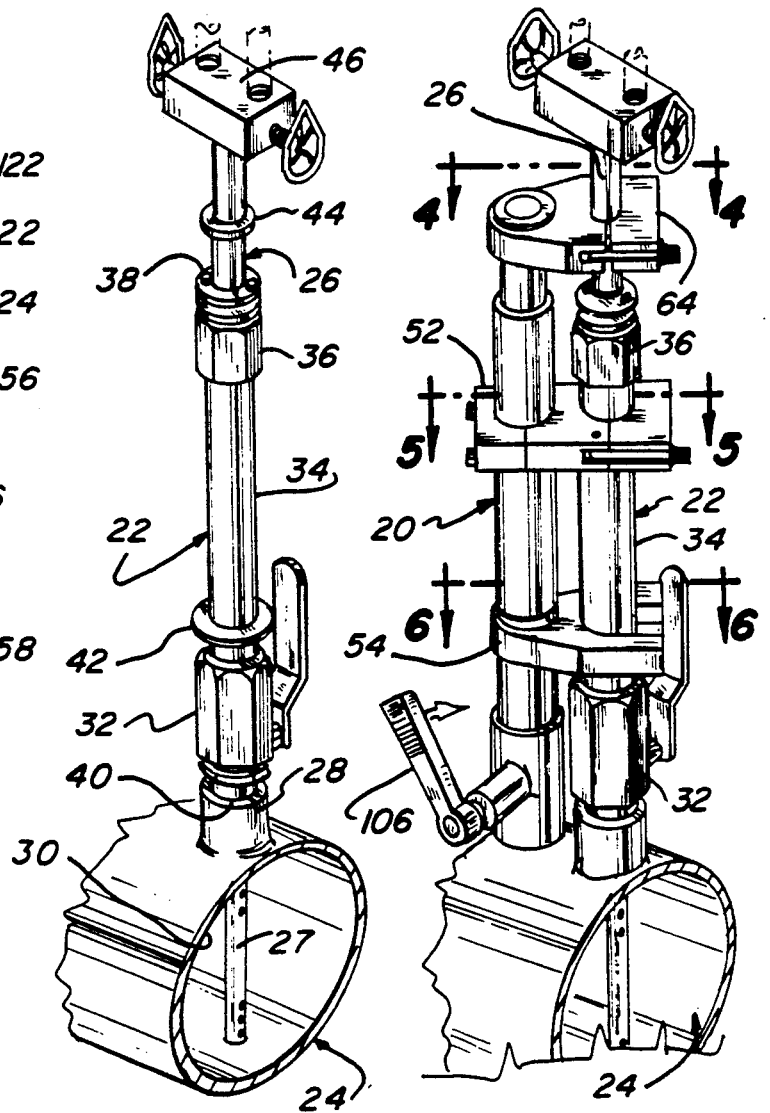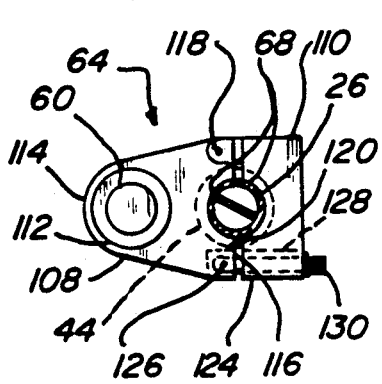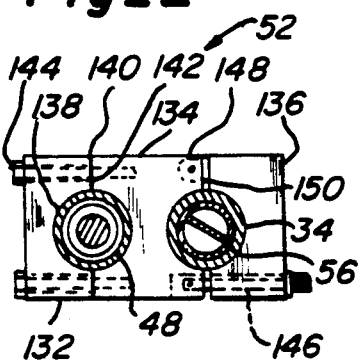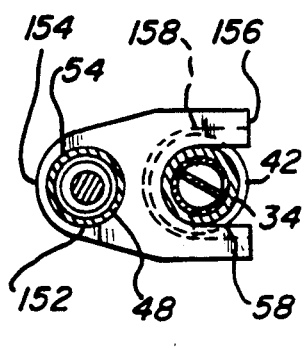
Fig_1  Fig_2  Fig_3  Fig_4  Fig_5  Fig_6

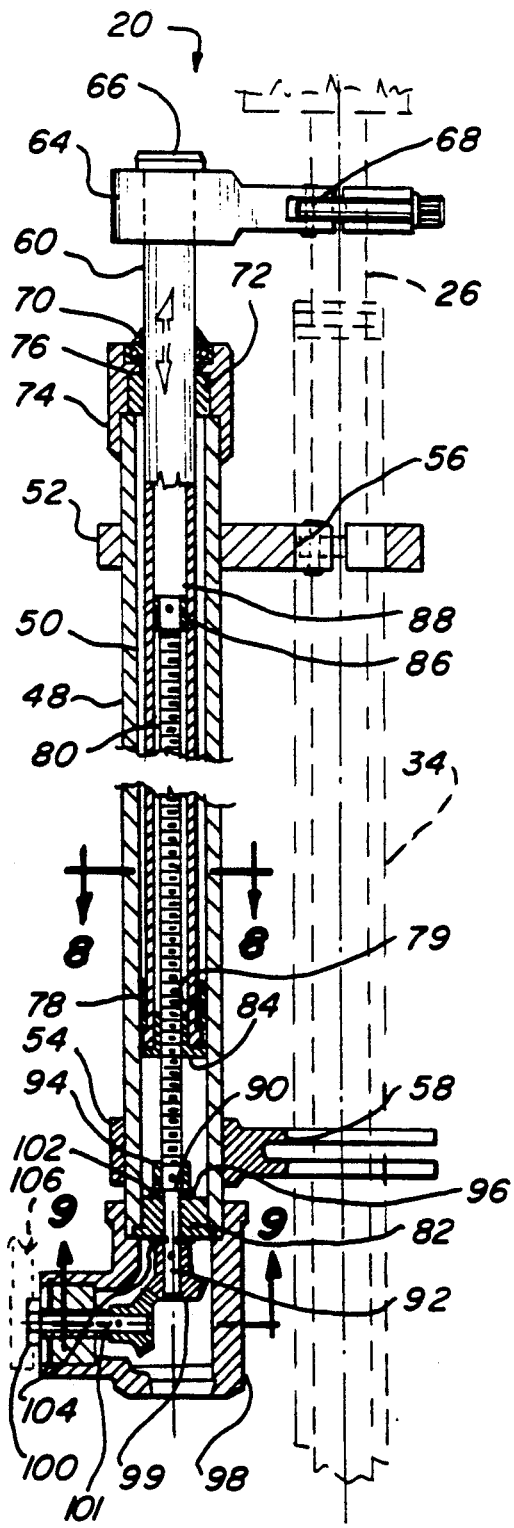
Fig_7
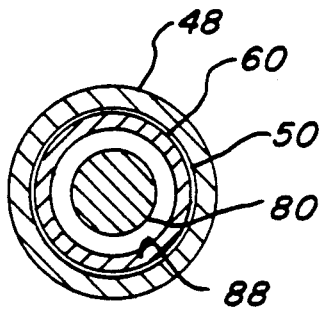
Fig_8
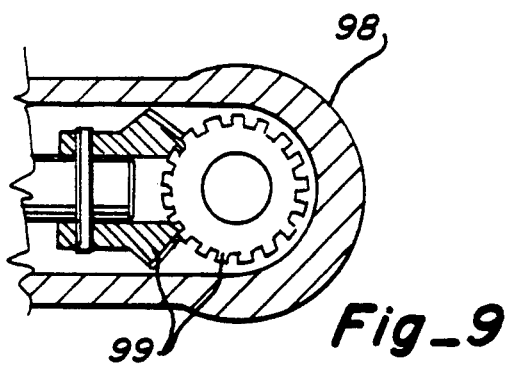
Fig_9
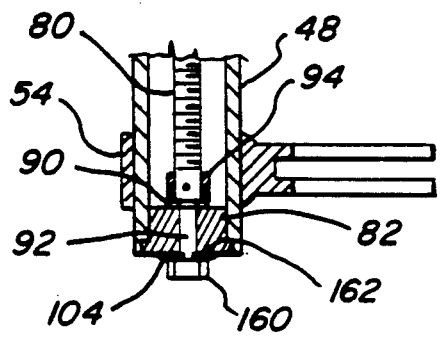
Fig_10

TOOL FOR INSERTING AND REMOVING A SENSING ELEMENT FROM A FLUID PIPELINE

BACKGROUND OF THE INVENTION

1. Field of the Invention

The present invention relates generally to tools for inserting pitot tubes and similar sensing elements into fluid conveying pipelines and removing sensing elements from the fluid conveying pipelines. More particularly, the present invention relates to tools for inserting and removing the sensing elements through stuffing boxes of hot taps in high pressure pipelines without interrupting the flow of fluid in pipelines.

2. Description of the Prior Art

In a fluid conveying pipeline, such as a gas pipeline, water pipeline, or petrochemical pipeline, it is often desirable to collect information about the flow, pressure or other parameters of the fluid flowing in the pipeline by insertion of a measuring device such as a pitot tube, hereinafter sometimes referred to generally as a sensing element, into the flowing fluid. For example, in order to measure flow, an elongated flow sensing element, such as the pitot tube described in U.S. Pat. No. 5,036,711, may be inserted into the flow.

It is also desirable to insert and remove sensing elements while the fluid is present and flowing in the pipeline. This facilitates moving sensing elements from location to location, when it is desired to measure the characteristic of the fluid only periodically, and facilitates removal of the sensing element for maintenance and cleaning and subsequent re-insertion.

In order to accomplish insertion and removal without interrupting flow, hot taps are widely used. A hot tap generally comprises an outlet through a wall of the pipeline conveying the fluid for which a parameter is to be measured. An access valve is connected to the outlet. The access valve is a valve of a type which provides an unobstructed access passageway to the interior of the pipeline when the valve is open. The access valve is connected by an access tube to a packing gland designed to seal around the sensing element while permitting the sensing element to be inserted and removed. To insert the sensing element into the hot tap the access valve is initially closed. An end of the sensing element is first inserted through the packing gland, forming a relatively fluid tight seal between the packing gland and the sensing element. The end of the sensing element is then inserted along a passageway the access tube until the end of the sensing element is near the location of the closed access valve. The access valve is opened, allowing the fluid in the pipeline to enter the access tube. The end of the sensing element is then passed through the access passageway of the access valve until it is inserted a preselected distance into the pipeline. The packing gland is adjusted to tighten the seal and the sensing element is secured by a conventional threaded connector or clamping means to prevent its being pushed out of the pipeline and access tube by fluid pressure. In order to remove the sensing element these steps are reversed.

Many problems are inherent in inserting and removing a sensing element through a hot tap. The pressure of the pipeline may be extremely high, creating a substantial force resisting insertion of the sensing element. In addition, the sensing element is typically long and slender, making it difficult to handle, and creating the possibility of binding at the packing gland and damaging the sensing element if it is not inserted or removed substantially along a longitudinal axis of the passageway of the access tube. In order to insert and remove the sensing element it is necessary to substantially align the sensing element with the longitudinal axis of the access tube before inserting the end of the sensing element into the packing gland. This requires an unobstructed insertion space between the packing gland and the nearest obstruction, such as another pipe, a wall or a ceiling, the insertion space being at least as long as the sensing element. Insertion and removal tools which align with the axis of the sensing element increase the required insertion space, making them difficult to use in restricted spaces. Further complicating matters hot taps are often located in dirt or debris laden environments, in which exposed moving parts of an insertion and removal tool may malfunction due to a buildup of dirt and debris on the moving parts.

Several insertion and removal tools, have been used to partially overcome these problems. Piston driven hydraulic tools have been used to apply an insertion force through a drive rod to the top of the measuring element, pushing the measuring element into the pipeline. These tools can provide the necessary force but are mechanically complex, making them prone to failure. Further, they must be aligned with the longitudinal axis of the sensing element and therefore add substantially to the required insertion space and to the difficulty of handling the sensing element.

Direct insertion tools using threaded stem and nut constructions, with a threaded stems aligned with the longitudinal axis of the sensing element and secured to the top of the sensing element, provide a mechanical advantage for manual insertion and are mechanically simpler than the hydraulic insertion devices, but share the disadvantage of requiring additional unobstructed insertion space. In addition, the threaded stem is directly exposed to the dirt and debris laden environment in which the devices are used, and is thus prone to fouling from dirt and debris. This buildup of dirt and debris on the stem may interfere with proper operation. This problem is accentuated by the fact that such stem and nut arrangements are frequently coated with an oil or grease which tends to retain the dirt and debris on the surface of the threaded stem.

Both the hydraulic piston and the threaded stem and nut tools push the probe into the pipeline against the pipeline pressure. The resulting force on the tool places the drive rod or stem of the tool in compression. When the drive rod or stem is in compression it can bend, possibly damaging the tool and potentially causing the sensing element to not be inserted substantially along the longitudinal axis of the access tube.

A side mounted threaded stem and nut tool which clamps to the access tube of the hot tap and to the top of the sensing element is described in U.S. Pat. No. 4,841,787, to Waterman, issued in 1989. The nut of the Waterman tool is located above a bushing that is slidable along the stem and is connected to the top of the sensing element. An actuating wrench is connected to the nut. When the nut is rotated by the wrench in one direction the nut bears down on the bushing and the sensing element is pushed into the hot tap against the pipeline pressure and friction in the packing gland. When the nut is rotated in the other direction pipeline pressure is allowed to force the sensing element out of the hot tap, controlled by the rotation of the nut. The side mounted stem and nut of the Waterman tool extends only a short distance above the top of the sensing element, thereby reducing the additional insertion space required by some other tools. A certain amount of added insertion space is required, however, to accommodate the actuating wrench, or lever, that is located beyond the end of the sensing element. The threaded stem and nut of the Waterman tool is exposed to the environment and is subject to fouling with dirt and debris. In addition, because the Waterman tool device normally relies on pipeline pressure to provide the force for removing the sensing element from the pipeline, partial disassembly is required to bring a lower nut into contact with the bottom of the slidable bushing in order to remove the sensing element in the event pipeline pressure is inadequate to overcome the frictional forces at the packing gland which may resist removal of a sensing element.

It is against this background that the present invention was developed to provide an improved tool for inserting and removing sensing elements.

SUMMARY OF THE INVENTION

A principal object of the present invention is to provide an insertion and removal tool for sensing elements in which the drive is a drive tube with an internally threaded drive bushing, mounted inside an outer enclosing tube. An externally threaded drive shaft is rotated inside the threaded drive bushing causing the drive bushing and drive tube to move into or out of the enclosing tube depending on the direction of rotation. The enclosing tube is sealed to inhibit entry of dirt and debris into the moving parts of the tool.

Another object of the present invention is to provide an insertion and removal tool mounted to the side of the hot tap access tube that is actuated in a manner that places the drive shaft and drive tube of the tool in tension when the sensing element is inserted. By keeping the drive shaft and drive tube in tension, they are held straight, preventing bending of the drive shaft and tube and promoting insertion of the sensing element along the axis of the access passageway of the hot tap.

It is another significant object of the present invention to provide an insertion and removal tool that is operated either from the bottom of the tool or through a right angle adapter from the side of the tool, thereby reducing the amount of insertion space needed between the top of the packing gland and the nearest obstruction.

It is still another significant object of the invention to provide an insertion and removal tool that is operated manually or by use of a motorized drive unit.

A further significant object of the present invention to provide an insertion and removal tool that employs an improved clamping arrangement to transfer the insertion and removal forces to the access tube.

A more complete understanding of the present invention can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a perspective view of the insertion and removal tool of the present invention.

FIG. 2 is a perspective view of a hot tap and sensing element with which the insertion and removal tool shown in FIG. 1 may be advantageously used.

FIG. 3 is a fragmentary perspective view of the insertion and removal tool shown in FIG. 1 installed for use with the hot tap and sensing element shown in FIG. 2

FIG. 4 is a sectional view taken substantially in the plane of line 4—4 of FIG. 3.

FIG. 5 is a sectional view taken substantially in the plane of FIG. 3.

FIG. 6 is a sectional view taken substantially in the plane of line 6—6 of FIG. 3.

FIG. 7 is a fragmentary sectional elevational view of the insertion and removal tool shown in FIG. 1.

FIG. 8 is a fragmentary sectional view taken substantially in the plane of line 8—8 of FIG. 7.

FIG. 9 is a fragmentary sectional view taken substantially in the plane of line 9—9 of FIG. 7.

FIG. 10 is a fragmentary sectional elevational view of an end of the insertion and removal tool shown in FIG. 7, illustrating an alternative drive.

DETAILED DESCRIPTION OF THE INVENTION

The preferred embodiment of the present invention is described by reference to FIGS. 1 through 10 inclusive.

FIG. 1 illustrates an insertion and removal tool 20 suitable for installation on a hot tap 22, as shown in FIG. 2, on a fluid conveying pipeline 24, and adapted for inserting and removing an averaging pitot tube or sensing element 26, such as those manufactured by the assignee of the present invention and described in U.S. Pat. No. 5,036,711. As used hereinafter sensing elements 26 includes all types of measuring devices, which are inserted in or removed from the hot tap 22 of the pipeline 24. Further, it is understood that the hot tap 22 may be on any fluid containing vessel and the invention is not limited to hot taps on pipelines 24.

The hot tap 22 comprises an outlet 28, such as a weld coupling, through a wall 30 of the fluid conveying pipeline 24. To this outlet 28 is connected an access valve 32 of a type that has an unobstructed access passageway (not shown) when the valve is open. Ball valves and gate valves are examples of valves that have such access passageways. An elongated hollow access tube 34 is connected to the access valve 32. The access tube 34 is terminated in a packing gland 36. The packing gland 36 is adapted to mate with and seal frictionally against an outer surface of the sensing element 26 while allowing the sensing element 26 to be moved through the packing gland 36.

An annular access tube thrust collar 42 is securely attached to the outer surface of the access tube 34 at a location intermediate between the access valve 32 and the packing gland 36. The access tube thrust collar 42 has a disc-like configuration and is preferably welded to the access tube 34.

The sensing element 26 is inserted into the hot tap 22 through the packing gland 36 and extends through the access valve 32 and into the pipeline 24 when fully installed. A sensing element thrust collar 44 having an annular disc-like configuration similar to that of the access tube thrust collar 42 is securely attached to the sensing element 26 near a head 46 of the sensing element 26, preferably by welding. In a manner well known, a measuring device and/or tubing (not shown) is connected to the head 46 to receive and/or measure information collected by a probe 27 of the sensing element 26.

It is often desirable to locate the outlet 28 for the hot tap 22 at the top of the fluid conveying pipeline 24, partially to prevent an accumulation of sediments and debris in the access tube 34 of the hot tap 20. It will therefore be a convention in this application to refer to the packing gland 36 end of the hot tap 22 as the top end 38 or first end and the outlet 28 end as the bottom end 40 or second end, and to refer to ends of the tool 20 and its component parts in a corresponding fashion. It is understood, however, that the hot tap 22 and tool 20 may be used in any orientation.

The construction and functioning of the tool will be explained by reference to FIG. 1. The tool 20 comprises a hollow cylindrical outer protective enclosing tube 48 which defines an inner bore 50. The enclosing tube 48 of the tool 20 has attached thereto a first clamping means comprising an upper access tube clamp 52 and a lower access tube clamp 54 which extend to one side of the enclosing tube 48. The upper access tube clamp 52 defines an upper access tube opening 56 which is of a size and shape to engage and grip the access tube 34 at a location intermediate between the access tube thrust collar 42 and the packing gland 36. The lower access tube clamp 54 has a lower access tube opening 58 which is coaxial with the upper access tube opening 56. The lower access tube 58 opening is of a location, size and shape to engage and mate with the access tube thrust collar 42. When the upper access tube clamp 52 and the lower access tube clamp 52 are engaged and mated with the access tube 34 and access tube thrust collar 42 the enclosing tube 48 is held in a parallel relationship with the access tube 34.

A first drive means comprising a hollow cylindrical drive tube 60 is located in the inner bore 50 of the enclosing tube 48. As can be seen in FIG. 8, the outer diameter of the drive tube 60 is slightly smaller than the diameter of the bore 50 of the enclosing tube 48 so that the drive tube 60 is slidable within the enclosing tube 48 along a longitudinal axis of the enclosing tube 48 parallel to the access tube 34. Referring to FIG. 7, the drive tube 60 is inserted into the inner bore 50 of the enclosing tube 48 through a top end 62 of the enclosing tube 48. A second clamping means comprising a sensing element clamp 64 is securely attached at a top end 66 of the drive tube 60 and extends to one side of the drive tube 60. The sensing element clamp 64 defines a sensing element opening 68 that has a shape and size adapted to mate with and grip the sensing element 26 at the sensing element thrust collar 44, and which is substantially coaxial with the access tube openings 56, 58 of the access tube clamps 52, 54.

A conventional annular seal 70 and an upper slide bearing 72 are held by a retainer ring 74 threadably connected to the enclosing tube 48 at the top end 66 of the enclosing tube. The annular seal 70 permits the drive tube 60 to move slidably along the longitudinal axis within the enclosing tube 48, while sealing the enclosing tube 48 from dirt and debris. The annular seal 70 also acts as a wiper, cleaning an outer surface of the drive tube 60 as it is retracted into the bore 50 of the enclosing tube 48. The upper slide bearing 72 is held in an annular recess 76 of the retainer ring 74 and is engaged slidably with the outer surface of the drive tube 60. A lower slide bearing 78 is secured in an annular recess 79 at the drive tube 60 near the bottom end of the drive tube 60. The lower slide bearing 78 slidably engages the surface of the bore 50 of the enclosing tube 48. The upper slide bearing 72 and lower slide bearing 78 cooperate to permit the drive tube 60 to move along the longitudinal axis within the bore 50 of the enclosing tube 48 while holding the drive tube 60 in a substantially coaxial, or centered, relationship within the bore 50 of the enclosing tube 48.

As illustrated in FIGS. 7 and 8, a second drive means comprising a threaded drive shaft 80 having a diameter smaller than an inner diameter of the drive tube 60 is located coaxially within the enclosing tube 48 and drive tube 60. The drive shaft 80 extends from a seal and thrust bearing assembly 82 connected to the bottom end of the enclosing tube 48 to a point intermediate between the bottom end and the top end of the enclosing tube 48. A internally threaded drive bushing 84 is attached to a lower end of the drive tube 60, preferably by welding. The external threads of the drive shaft 80 mate with and engage the internal threads of the drive bushing 84.

An intermediate slide bearing 86 is attached at the top end of the drive shaft 80 and slidably engages an inner surface 88 of the drive tube 60, thereby aligning the drive shaft 80 within the drive tube 60 along the vertical axis of the tool 20 while permitting the drive tube 60 to move vertically.

A washer 90 is seated on the thrust bearing assembly 82 extending about the drive shaft 80. An integral reduced diameter lower section 92 of the drive shaft 80 projects through the washer 90 and the thrust bearing assembly 82. A thrust bushing 94 is attached to the drive shaft 80 immediately above the washer 90. The thrust bushing 94 bears against the washer 90 and the washer 90 bears against a top bearing surface 96 of the thrust bearing assembly 82 to restrain the drive shaft 80 from downward movement.

As shown in FIGS. 7 and 9 an actuator or drive means, such as a conventional type right angle gear drive 98 and an actuator nut 100 is attached to the reduced diameter lower section 92 of the drive shaft 80. A bearing surface 102 of the right angle gear drive 98 bears against a lower bearing surface 104 of the thrust bearing assembly 82 to restrain the drive shaft 80 from upward movement.

A right angle gear drive 98 that uses a meshed pair of beveled gears 99 to connect the actuator nut 100 to the drive shaft 80 is used in the preferred embodiment. One gear 99 is splined or otherwise connected directly to the lower section 92 of the drive shaft 80. The other gear 99 is connected to one end of a shaft 101, the other end of the shaft 101 being connected to the actuator nut 100. Other types of right angle gear drives, for example a worm and worm gear drive, may also be adapted for use as the right angle gear drive 98.

The actuator nut 100 may be rotated by means of a suitable rotating means such as a wrench, crank, handle, lever, handwheel or portable or permanent motorized actuator drive of a conventional type. These various alternative rotating means are referred to herein as an actuator wrench 106.

Rotating the actuator nut 100 with the actuator wrench 106 causes a rotative motion that is transmitted through the right angle gear drive 98 to the drive shaft 80, causing the drive shaft 80 to rotate. The drive shaft 80 is restrained by the thrust bearing assembly 82 from upward or downward movement as previously described. The drive bushing 84 is not vertically restrained. Therefore, when the tool 20 is clamped to the sensing element 26 and the hot tap 22 by the clamps 52, 54, 64, the engaged relationship of the external threads of the drive shaft 80 and the internal threads of the drive bushing 84 cause the drive bushing 84 to move upward or downward, depending on the direction of rotation of the actuator wrench 106, right angle gear drive 98, actuator nut 100, and drive shaft 80.

Upward motion of the drive bushing 84 is transmitted to the connected drive tube 60, causing the drive tube to extend from the top of the enclosing tube 48. Downward motion of the drive bushing 84 retracts the drive tube 60 into the enclosing tube 48. The intermediate slide bearing 86 acts as an upper stop, preventing extension of the drive tube 60 beyond a point where the drive bushing 84 contacts the intermediate slide bearing 86. Similarly, the thrust bushing 94 acts as a lower stop to prevent retraction of the drive tube 60 beyond a point where the drive bushing 84 contacts the thrust bushing 94.

The preferred embodiment of present invention incorporates an improved clamping arrangement that incorporates quick-connect and disconnect features to facilitate installation and removal of the tool 20, while transmitting thrust forces from the tool 20 to the sensing element 26 and access tube 34.

The sensing element clamp 64 is described in more detail in conjunction with FIG. 4. The sensing element clamp 64 has a fixed member 108 and a hinged member 110. The fixed member 108 is a relatively thick plate-like member with a hole 112 matching the drive tube 60 extending from a top to a bottom planar surface near a rear edge 114 of the fixed member 108. The drive tube 60 is inserted through the hole 112 perpendicularly and rigidly attached the fixed member 108, preferably by welding. The hinged member 110 is a relatively thick plate like member that is co-planar with the fixed member 108. The hinged member 110 is attached at one side of a front edge of 116 of the fixed member 108 by a hinged connection 118. One half of the sensing element opening 68 is formed in the front edge 116 of the fixed member 108 and another half of the sensing element opening 68 is formed in a rear edge 120 of the hinged member 110, so that when the hinged member 110 is in a closed position, with the front edge 116 of the fixed member 108 adjacent to the rear edge 120 of the hinged member 110, the sensing element opening 68 mates with the sensing element 26. A thrust groove 122 (FIG. 1) mating with the sensing element thrust collar 44 is formed in the front edge 116 of the fixed member 108 and the rear edge 120 of the hinged member 110. When the sensing element clamp 64 is closed around the sensing element 26 the sensing element thrust collar 44 is retained in the thrust groove 122 and is restrained against vertical movement relative to the drive tube 60.

A threaded latching bolt 124 is connected by a hinged connection 126 at the front edge of the fixed member 108 at a side opposite the hinged connection 118 to the hinged member 108. A receiving groove 128 formed in a corresponding side of the hinged member 110 engages the latching bolt 124. A latching nut 130 is threaded onto an end of the latching bolt 128 opposite the hinged connection 126. When the latching nut 130 is in a loosened position the hinged connection 126 allows the latching bolt 124 be moved out of the receiving groove 128, permitting the hinged member 110 of the sensing element clamp 64 to be opened. When the hinged member 110 of the sensing element clamp 64 is moved to a closed position the latching bolt 124 may be moved into the receiving groove 128 and the latching nut 130 tightened against the hinged member 110 to hold the hinged member 110 in the closed position.

The upper access tube clamp 52 is described in more detail in conjunction with FIG. 5. The upper access tube clamp 52 comprises a rear fixed member 132, a front fixed member 134 and a hinged member 136. The rear and front fixed members 132, 134 are relatively thick plate-like co-planar members with a hole 138 substantially matching the enclosing tube 48 formed one half in a front edge 140 of the rear fixed member 132 and one half in a rear edge 142 of the front fixed member 134, and extending from top to bottom planar surfaces of the rear and front fixed members 132, 134. The rear fixed member 132 is releasably connected to the front fixed member 134 by two bolts 144 through unthreaded holes in the rear fixed member 132 and threaded into threaded holes in the rear edge 142 of the of the front fixed member 134. The enclosing tube 48 is inserted through the hole 138 perpendicularly to the fixed members 132, 134 and rigidly attached to the upper access tube clamp 52 by tightening the bolts 144, bringing the rear and front fixed members 132, 134 into frictional contact with the enclosing tube 48. The connection thus formed can be released by loosening the bolts 144 to permit locating the upper access tube clamp 52 at a desired location along the enclosing tube 48. The hinged member 136 is a relatively thick plate-like member that is co-planar with the fixed members 132, 134. The hinged member 136 is attached to the front fixed member 134 and is latched by a latching bolt 146 in the same manner as described previously for the sensing element clamp 64. One half of the upper access tube opening 56 is formed in a front edge 148 of the front fixed member 134 and another half of the upper access tube opening 56 is formed in a rear edge 150 of the hinged member 136, so that when the hinged member 136 is in a closed position the upper access tube opening 56 engages and mates with the access tube 34.

The lower access tube clamp 54 is described in more detail in conjunction with FIG. 6. The lower access tube clamp 54 comprises a relatively thick plate-like member with a hole 152 matching the enclosing tube 48 extending from a top to a bottom planar surface near a rear edge 154 of the clamp 54. The enclosing tube 48 is inserted perpendicularly through the hole 152 and rigidly attached to the lower access tube clamp 54, preferably by welding. The lower access tube opening 58 is formed in a front edge 156 of the lower access tube clamp 54 and extends from the front edge 156 to a location intermediate between the front edge 156 and the rear enclosing tube 48. The lower access tube opening 58 has a semicircular rear portion substantially matching the shape of the access tube 34 and a front portion having a substantially uniform width larger than the diameter of the access tube 34, so that clamp 54 may be mounted onto the access tube 34 without impediment. A thrust groove 158 (FIG. 1) substantially matching the access tube thrust collar 42 is formed in the front edge 156 of the fixed member 108 and along an edge of the lower access tube opening 58. When the lower access tube clamp 64 is mounted onto the access tube 34 the access tube thrust collar 42 is retained in the thrust groove 158 and is restrained against vertical movement relative to the enclosing tube 48.

The use of the tool 20 is explained in conjunction with FIGS. 1, 2, 3 and 7. To use the tool 20, the sensing element 26 is partially inserted into the access tube 34. The lower access tube clamp 54 is mounted onto the access tube 34 of the hot tap 22, engaging the access tube thrust collar 42 in the thrust groove 158 of the lower access tube clamp 54. The upper access tube clamp 52 is securely attached to the access tube 34 by closing the upper access tube clamp 52 and locking it with the locking bolt 146. The access tube clamps 52, 54 hold the enclosing tube 48 in a fixed location with respect to the access tube 34 The engagement of the lower access tube clamp 54 with the access tube thrust collar 42 prevents the enclosing tube 48 from moving vertically with respect to the access tube 34.

The drive tube 60 is extended from the enclosing tube 48 a distance to align the sensing element clamp 64 with the sensing element thrust collar 44. The sensing element clamp 64 is securely attached to the sensing element 26 by engaging the sensing element thrust collar 44 into the thrust groove 122 of the sensing element clamp 64, closing the sensing element clamp 64 and locking the sensing element clamp 64 with the locking bolt 124. The sensing element 26 is thus restrained from vertical movement with respect to the drive tube 60.

Because the enclosing tube 48, and thus the thrust bearing assembly 82, and drive shaft 80 are secured to the access tube 34 by the access tube clamps 52, 54 and the drive tube 60 is secured by the sensing element clamp 64 to the sensing element 26, downward movement of the drive tube 60 translates into downward movement of the sensing element 26, inserting the sensing element 26 into the access tube 34 and into the fluid conveying pipeline 24. Upward movement of the drive tube 60 causes upward movement of the sensing element 26, removing the sensing element 26 from the pipeline 24.

When the sensing element 26 is inserted through the hot tap 22 the downward movement is resisted by friction in the packing gland 36 and, when the access valve 32 is open, by fluid pressure in the pipeline 24. This resistance creates an upward force which is transmitted to the drive tube 60 by the sensing element thrust collar 44 and clamp 64, and which exerts an upward force on the drive tube 60 and drive bushing 84. This upward force is transmitted through the engaged threads of the drive bushing 84 and the drive shaft 80 to the drive shaft 80 and the bearing surface 102 of the right angle drive 98. The upward force is resisted by the bearing surface 102 of the right angle gear drive 98 bearing against the bottom bearing surface 104 of the thrust bearing assembly 82, holding the drive shaft 80 and drive tube 60 in tension. With the drive shaft 80 and drive tube 60 held in tension, bending of the drive shaft 80 and drive tube 60 is prevented. The restraining force is transmitted by the thrust bearing assembly 82 to the enclosing tube 48, and by the lower access tube clamp 54 from the enclosing tube 48 to the access tube thrust collar 42, to the access tube 34 and, ultimately, to the pipeline 24.

When the sensing element 26 is removed from the hot tap 22 the force created by fluid pressure in the pipeline 24 acts to assist the removal by pushing the sensing element 26 out, until the access valve 32 is closed. If the force created is greater than that needed to overcome the weight of the sensing element 26 and friction between the sensing element 26 and the packing gland 36, the tool 20 acts to restrain and control the upward motion of the sensing element 26. In this case, the drive tube 60, and thus the sensing element 26, is allowed to move upward by rotating the actuator nut 100, right angle gear drive 98, and drive shaft 80. This again places the drive shaft 80 and drive tube 60 in tension and prevents bending.

If the force created by the fluid is not sufficient to overcome the weight of the sensing element 26 and friction on the packing gland 36, and after the access valve 32 is closed, the rotation of the actuator nut 100, right angle gear drive 98, and drive shaft 80, gear forces the drive bushing 84 and the drive tube 60 upward, pulling the sensing element 26 from the hot tap 22. This places the drive shaft 80 and drive tube 60 in compression between the sensing element clamp 64 and the top bearing surface 96 of the thrust bearing assembly 82, but at forces much lower than those encountered in inserting the sensing element 26 against pipeline 24 pressure.

In an alternative preferred embodiment, shown in FIG. 10, like parts retaining the same numbers as in the preferred embodiment, the right angle gear drive 98 is absent and the actuator nut 100 is replaced by an actuator nut 160 directly connected to the lower section 92 of the drive shaft 80. A thrust surface 162 of actuator nut 160 bears against the lower bearing surface 104 of the thrust bearing assembly 82 to restrain the drive shaft 80 from upward movement.

In a further alternative preferred embodiment one or more of the access tube clamps 52, 54 (FIG. 1) are replaced with clamps (not shown) permanently attached, preferably by welding, to the access tube 34 (FIG. 2). Such permanently attached clamps lack the quick-connect and disconnect features described above. In addition, the access tube thrust collar 42 may be unnecessary in such an arrangement, with thrust being transmitted from the enclosing tube 48 to the access tube 34 by the permanent attachment of the access tube clamps to the access tube 48.

In any of the preferred embodiments, a power drive (not shown) of a conventional type, for example a portable drive resembling a reversible power drill, may be used to provide the rotative force necessary to rotate the actuator nut 100 or 160, and drive shaft 80, thereby raising or lowering the drive bushing 82, drive tube 60, and the sensing element 26.

Although the present invention has been described with a certain degree of particularity, it is understood that the present disclosure has been made by way of preferred example, and changes in detail or structure may be made without departing from the spirit of the invention, as described in the appended claims.

I claim:

1. An apparatus for inserting an elongated sensing element into a chamber through an elongated access tube, an end of the access tube being in fluid communication with the chamber, said apparatus comprising:

enclosing means for defining a protected inner bore;

first drive means protruding from the enclosing means for longitudinal movement parallel to an axis of the access tube;

first means for securing the enclosing means to the access tube and transmitting forces in the enclosing means to the access tube;

second means for securing the first threaded drive tube means to the sensing element and transmitting longitudinal movement of the first drive means to the sensing element;

second drive means coaxial with and threadedly engaged within the first drive means for causing longitudinal movement of the first drive means due to the engagement of the first and second drive means when the second drive means is rotated;

a thrust restraining means for transmitting forces in the second drive means to the enclosing means; and actuator means for rotating the second drive means in a preselected rotational direction to cause the first drive means to move in a selected one of a longitudinal extending direction or retracting direction relative to the enclosing means.

2. An apparatus as defined in claim 1 wherein:
the first drive means is internally threaded; and
the second drive means is externally threaded.

3. An apparatus as defined in claim 1 wherein:
the enclosing means has a first end and an opposite second end;
the first drive means protrudes from the enclosing means at the first end of the enclosing means;
the second drive means protrudes from the enclosing means at the second end of the enclosing means; and
the actuator means is connected to the second drive means adjacent to the second end of the enclosing means.

4. An apparatus as defined in claim 3 wherein the thrust restraining means is connected to the enclosing means at the second end of the enclosing means.

5. An apparatus for inserting an elongated sensing element into a chamber through an elongated access tube, an end of the access tube being in fluid communication with the chamber, said apparatus comprising:
an elongated outer enclosing tube defining an inner bore and having a first and a second end;
an elongated drive tube slidably inserted into the inner bore of the enclosing tube, located coaxially with the enclosing tube, having a first and a second end, the first end of the drive tube protruding from the enclosing tube at the first end of the enclosing tube;
first means for securing the enclosing tube to the access tube in a parallel relationship with the access tube;
second means for securing the drive tube to the sensing element;
an elongated externally threaded drive shaft located coaxially within enclosing tube and the drive tube;
an internally threaded drive bushing rigidly attached to the drive tube, the internal threads of the drive bushing engaging the external threads of the drive shaft to move the drive bushing and the drive tube axially within the bore of the enclosing tube when the drive shaft is rotated;
a thrust bearing assembly attached to the enclosing tube to restrain the drive shaft against axial movement; and
actuator means connected to the drive shaft, the connection transmitting rotational motion of the actuator means to the drive shaft whereby a selected rotational direction of the actuator means moves the drive tube in a selected one of a longitudinal extending direction or retracting direction relative to the enclosing tube.

6. An apparatus as defined in claim 5 further comprising:
a seal at the first end of the enclosing tube in slidable contact with an outer surface of the drive tube to inhibit the entry of dirt and debris into the inner bore of the enclosing tube and to wipe the outer surface of the drive tube when the drive tube is moved in the retracting direction relative to the enclosing tube.

7. An apparatus as defined in claim 5 wherein the first clamping means comprises:
an access tube thrust collar rigidly attached to the access tube at a location along the access tube intermediate between the end of the access tube in fluid communication with the chamber and another, opposite, end of the access tube;
a lower access tube clamp rigidly attached to the enclosing tube at a location along the enclosing tube corresponding to the location of the thrust collar on the access tube, to mate with and engage the access tube to hold the enclosing tube in a parallel relationship with the access tube, said lower access tube clamp including a thrust groove to engage and mate with the access tube thrust collar to transmit longitudinal forces in the enclosing tube to the access tube when the lower access tube clamp is mated to the enclosing tube; and
an upper access tube clamp releasably connected to the enclosing tube at a location along the enclosing tube intermediate between the lower access tube clamp and the first end of the enclosing tube, said upper access tube clamp being a quick-connect and disconnect clamp to engage and mate with the access tube to hold the enclosing tube in a parallel relationship with the access tube.

8. An apparatus as defined in claim 5 wherein the first clamping means comprises:
a lower access tube clamp attached by a rigid attachment to the enclosing tube at a location along the enclosing tube intermediate between the first end and the second end of the enclosing tube and attached by a rigid attachment to the access tube at a corresponding location along the access tube; and
an upper access tube clamp attached by a rigid attachment to the enclosing tube at a location along the enclosing tube intermediate between the lower access tube clamp and the first end of the enclosing tube and attached by a rigid attachment to the access tube at a corresponding location along the access tube; and wherein:
the lower access tube clamp and the upper access tube clamp cooperate to hold the enclosing tube in a parallel relationship with the access tube; and
the rigid attachments of the lower access tube clamp to the enclosing tube and the access tube and the rigid attachments of the upper access tube clamp to the enclosing tube and the access tube cooperate to transmit longitudinal forces in the enclosing tube to the access tube.

9. An apparatus as defined in claim 5 wherein the second clamping means comprises:
a sensing element thrust collar rigidly attached to the sensing element at a location along the sensing element near an end of the sensing element;
a sensing element clamp rigidly attached to the drive tube at the first end of the drive tube, said sensing element tube clamp being a quick-connect and disconnect clamp to engage and mate with sensing element, said sensing element clamp including a thrust groove to engage and mate with the sensing element thrust collar to transmit longitudinal forces in the drive tube to the sensing element and to transmit longitudinal forces in the sensing element to the drive tube when the sensing element clamp is mated to the sensing element.

10. An apparatus as defined in claim 5 wherein:
the thrust bearing assembly is attached to the enclosing tube at the second end of the enclosing tube;
the drive shaft has a first and a second end, the first end of the drive shaft being located within the inner bore of the enclosing tube, and the second end of the drive shaft being rotatably connected to the thrust bearing assembly and protruding from the enclosing tube at the second end of the enclosing tube; and the actuator means is connected to the drive shaft at the second end of the drive shaft.

11. An apparatus as defined in claim 10 wherein the actuator means comprises an actuator nut.

12. An apparatus as defined in claim 11 wherein the actuator means further comprises:

a right angle gear drive connected to the drive shaft; and wherein:

the actuator nut is connected to the right angle gear drive, rotational motion of the actuator nut being transmitted by the right angle gear drive to the drive shaft.

13. An apparatus as defined in claim 10 wherein the actuator means comprises a power drive means connected to the drive shaft, rotational motion of the power drive means being transmitted to the drive shaft.

14. An apparatus as defined in claim 10 wherein the drive bushing is rigidly attached to the drive tube at the second end of the drive tube.

15. An apparatus as defined in claim 5 wherein:

the chamber is a fluid conveying pipeline;

the end of the access tube in fluid communication with the fluid conveying pipeline is connected to the pipeline through an access valve having an unobstructed passageway through the access valve when the access valve is in an opened position; and a packing gland adapted for sealing against a surface of the sensing element is connected to another opposite end of the access tube.

16. An apparatus as defined in claim 5 wherein the sensing element is a pitot tube.

17. An apparatus for inserting an elongated pitot tube into a fluid conveying pipeline through a hot tap connected to an outlet in said pipeline, said hot tap comprising an access value having an unobstructed opening through the valve when the valve is in an opened position, an elongated access tube having an end connected to the access valve and another, opposite, end connected to a packing gland adapted for sealing against a surface of the sensing element, said apparatus comprising:

an elongated outer enclosing tube defining an inner bore and having a first and a second end;

an elongated drive tube slidably inserted into the inner bore of the enclosing tube, located coaxially with the enclosing tube, having a first and a second end, the first end of the drive tube protruding from the enclosing tube at the first end of the enclosing tube;

an access tube thrust collar rigidly attached to the access tube at a location along the access tube intermediate between the access valve and the packing gland;

a lower access tube clamp rigidly attached to the enclosing tube at a location along the enclosing tube corresponding to the location of the thrust collar on the access tube to mate with and engage the access tube to hold the enclosing tube in a parallel relationship with the access tube, said lower access tube clamp including a thrust groove to engage and mate with the access tube thrust collar to transmit longitudinal forces in the enclosing tube to the access tube when the lower access tube clamp is mated to the enclosing tube;

an upper access tube clamp releasably connected to the enclosing tube at a location along the enclosing tube intermediate between the lower access tube clamp and the first end of the enclosing tube, said upper access tube clamp being a quick-connect and disconnect clamp to engage and mate with the access tube to hold the enclosing tube in a parallel relationship with the access tube;

a sensing element thrust collar rigidly attached to the sensing element a location along the sensing element near an end of the sensing element;

a sensing element clamp rigidly attached to the drive tube at the first end of the drive tube, said sensing element tube clamp being a quick-connect and disconnect clamp to engage and mate with sensing element, said sensing element clamp including a thrust groove to engage and mate with the sensing element thrust collar to transmit longitudinal forces in the drive tube to the sensing element and to transmit longitudinal forces in the sensing element to the drive tube when the sensing element clamp is mated to the sensing element;

an elongated externally threaded drive shaft located coaxially within the enclosing tube and the drive tube, said drive shaft having a first and a second end, the first end of the drive shaft being located within the inner bore of the enclosing tube and the second end of the drive shaft protruding from the enclosing tube at the second end of the enclosing tube;

an internally threaded drive bushing rigidly attached to the second end of the drive tube, the internal threads of the drive bushing engaging the external threads of the drive shaft to move the drive bushing and the drive tube axially within the bore of the enclosing tube when the drive shaft is rotated; a thrust bearing assembly is attached to the enclosing tube at the second end of the enclosing tube;

the thrust bearing assembly is attached to the enclosing tube at the second end of the enclosing tube and rotatably connected to the drive shaft at the second end of the drive shaft to restrain the drive shaft against longitudinal movement; and an actuator nut connected to the drive shaft at the second end of the drive shaft, the connection transmitting rotational motion of the actuator nut to the drive shaft whereby a selected rotational direction of the actuator means moves the drive tube in a selected one of a longitudinal extending direction or retracting direction relative to the enclosing tube.

18. An apparatus as defined in claim 17 further comprising a right angle gear drive connected to the drive shaft at the second end of the drive shaft and wherein the actuator nut is connected to the drive shaft through the right angle gear drive.

19. An apparatus for inserting and removing an elongated sensing element into and from a chamber through an elongated access tube, an end of the access tube being in fluid communication with the chamber, said apparatus comprising:

actuator means for moving an inner movable drive tube relative to an outer stationary enclosing tube, said drive tube slidable along a longitudinal axis of said enclosing tube; and clamping means selectively connected to said actuator means and second clamping means selectively connected to a drive tube, both of said clamping means and said sensing element clamping said access tube and said sensing element in a generally parallel relationship to said actuator means, whereby clamping said clamping means to said sensing element and said access tube and actuating said actuator means moves said sensing element relative to said access tube.

20. An apparatus for inserting and removing an elongated sensing element into and from a chamber through an elongated access tube, an end of the access tube being in fluid communication with the chamber, said apparatus comprising:

actuator means including an outer stationary enclosing tube and an inner movable drive tube slidable along a longitudinal axis of said enclosing tube and drive means operatively connected thereto for moving said drive tube relative to said enclosing tube; and first clamping means selectively connected to said actuator means and second clamping means selectively connected to a drive tube, both of said clamping means extending laterally away from said longitudinal axis for clamping said access tube and said sensing element respectively, whereby clamping said clamping means to said sensing element and said access tube and actuating said actuator means moves said sensing element relative to said access tube.

21. The apparatus as defined in claim 20 wherein:

said first clamping means includes a first fixed portion and a hinged portion connected thereto, and a second fixed portion having a mating groove formed therein to engage a like shaped collar on said access tube; and said second clamping means includes a fixed portion and a hinged portion connected thereto, said fixed and hinged portions having a mating groove formed therein to engage a like shaped collar on said sensing element.

22. The apparatus as defined in claim 21 wherein:

said fixed and hinged portions are selectively connected by a quick-connect and disconnect.

* * * * *